United States Patent [19]
Hines

[11] Patent Number: 4,982,564
[45] Date of Patent: Jan. 8, 1991

[54] TURBINE ENGINE WITH AIR AND STEAM COOLING

[75] Inventor: William R. Hines, Cincinnati, Ohio

[73] Assignee: General Electric Company, Cincinnati, Ohio

[21] Appl. No.: 284,507

[22] Filed: Dec. 14, 1988

[51] Int. Cl.$^5$ .............................. F02C 3/30; F02C 7/16
[52] U.S. Cl. .................................... 60/39.55; 60/39.53
[58] Field of Search .................... 60/39.05, 39.19, 39.3, 60/39.53, 39.54, 39.55, 39.58, 39.59; 415/114, 115

[56] References Cited

U.S. PATENT DOCUMENTS

| | | | |
|---|---|---|---|
| 3,038,308 | 6/1962 | Fuller . | |
| 3,527,543 | 9/1970 | Howald | 416/90 |
| 3,703,808 | 11/1972 | Stearns | 60/39.66 |
| 3,715,170 | 2/1973 | Savage et al. | 416/97 |
| 3,729,930 | 5/1973 | Williams | 60/39.58 |
| 3,747,336 | 7/1973 | Dibelius et al. | 60/39.55 |
| 3,899,884 | 8/1975 | Ekstedt | 60/39.74 |
| 3,965,066 | 6/1976 | Sterman et al. | 60/39.32 |
| 4,296,599 | 10/1981 | Adamson | 60/39.23 |
| 4,314,442 | 2/1982 | Rice | 60/39.05 |
| 4,338,780 | 7/1982 | Sakamoto et al. | 60/39.05 |
| 4,384,452 | 5/1983 | Rice | 60/39.182 |
| 4,569,195 | 2/1986 | Johnson | 60/39.3 |
| 4,614,083 | 9/1986 | Teshima et al. | 60/39.53 |
| 4,631,914 | 12/1986 | Hines | 60/39.05 |

FOREIGN PATENT DOCUMENTS

| | | |
|---|---|---|
| 746377 | 3/1956 | United Kingdom . |
| 759037 | 10/1956 | United Kingdom . |
| 774425 | 5/1957 | United Kingdom . |
| 1140757 | 1/1969 | United Kingdom . |
| 1479599 | 7/1977 | United Kingdom . |

OTHER PUBLICATIONS

Johnson, Paul, "Steam Injection for Power and Efficiency", *Diesel & Gas Turbine Worldwide*, Nov., 1986.

*Primary Examiner*—Louis J. Casaregola
*Attorney, Agent, or Firm*—Jerome C. Squillaro

[57] ABSTRACT

Component members of a gas turbine engine are cooled by using an engine having a compressor for introducing air into the engine. A combustor is downstream from the compressor which has a casing, and a liner positioned in the casing. The liner is spaced apart from the casing such that a mixing region is positioned between the liner and the casing. The liner has a combustor inlet at the upstream end of the combustor. A turbine, which typically consist of one or more stages having cooling passages therein, is positioned downstream from the combustor. A steam conduit is connected to a steam inlet and the steam inlet is connected to the casing. The inlet has at least one inlet hole which connects the steam inlet with the mixing region and the inlet hole is downstream from the combustor inlet. A passageway is positioned between the mixing region and the turbine cooling passage and the passageway is downstream of the steam inlet hole. In operation steam is introduced into the mixing region downstream of the combustor inlet such as to form an air and steam mixture and then the air and steam mixture is introduced into the cooling passage.

16 Claims, 2 Drawing Sheets

TURBINE ENGINE WITH AIR AND STEAM COOLING

The invention relates to gas turbine engines and, more particularly, to the cooling circuits which are incorporated into these engines.

BACKGROUND OF THE INVENTION

Gas turbine engines conventionally comprise an axial flow compressor which compresses air to the proper density required for supporting combustion of fuel in a combustion chamber. The combustion gases then pass to a turbine which powers the axial flow compressor. After passing through the turbine, the combustion gases may be employed to drive a power turbine which is connected to an output shaft on which may be mounted a propeller, generator or other device such as for marine or industrial purposes.

The combustion of fuel within the combustion chamber results in intensely heated combustion gases which heat the walls of the combustion chamber and the various turbine components as the gases pass through the turbine. Increasing combustion firing temperatures can improve shaft horsepower, specific fuel consumption and efficiency of the engine. However, the ability to increase these temperatures is limited by the ability of the engine components such as the combustion chamber and the turbine to withstand increased temperatures. Therefore, to avoid overheating, cooling methods have been developed to cool combustors, and turbine vanes and blades.

Conventional cooling techniques provide that some of the air input into the engine through the compressor is diverted and used as a coolant. Typically, the diverted air passes outside the combustion chamber and enters passageways which flow around the combustion chamber and then through cooling passages in the turbine blades.

Other cooling techniques have included the use of steam in which steam is introduced into the interior of the blading and exits tangentially onto the exterior surfaces of the blading such as to thermally insulate the blades from the hot combustion gases. This technique has some advantages since the specific heat of steam is much greater than air and therefore steam is a much better coolant. However, the steam used in cooling reduces overall system performance since this steam bypasses some of the the engine's flowpath turbine stages and, therefore, is not injected in the engine as described by my U.S. Pat. No. 4,631,914 entitled "Gas Turbine Engine of Improved Thermal Efficiency," issued Dec. 30, 1986, and by K. O. Johnson in U.S. Pat. No. 4,569,195 entitled "Fluid Injection Gas Turbine Engine And Method for Operating" issued Feb. 11, 1986. Therefore, it would be desirable to have an improved method of engine cooling which does not significantly inhibit system performance.

SUMMARY OF THE INVENTION

A turbine engine which comprises a compressor for introducing compressed air into said engine and a combustor downstream from the compressor. The combustor comprises a casing and a liner which is positioned within the casing such as to contain a combustion zone therein. The liner is spaced apart from the casing and a mixing region is positioned between the liner and the casing such as to receive at least a portion of the compressed air. The liner forms a combustor inlet at the upstream end of the combustor. A turbine, which has a cooling passage therein, is positioned downstreax from the combustor. The engine has a means for introducing steam into the mixing region downstream of the rombustor inlet such as to form an air and steam mixture and a means for introducing the mixed air and steam mixture into the cooling passage.

A method for cooling the gas turbine engine comprises introducing steam into the mixing region downstream of the combustor inlet such as to form an air and steam mixture and introducing the mixed air and steam mixture into the cooling passage.

The invention also includes a turbine engine which comprises a compressor for introducing air into the engine and a combustor region which is downstream from the compressor. The combustor region comprises a casing which defines an annular flowpath downstream of the compressor and a combustor liner which is positioned within the casing. The liner is formed such as to contain a combustion zone therein and the liner is spaced apart from the casing and a mixing region is positioned therebetween. A dual flow fuel nozzle extends through the casing, mixing region and liner. The dual flow fuel nozzle has a fuel passage and a steam passage therein and the fuel and steam passages are separated at least until the dual flow fuel nozzle passes through the liner. The dual flow fuel nozzle has an outer surface and has at least one hole extending from the surface to the steam passage such that a portion of the steam may exit into the mixing region around the combustion liner.

DETAILED DESCRIPTION OF PREFERRED EMBODIMENTS

Figure 1:
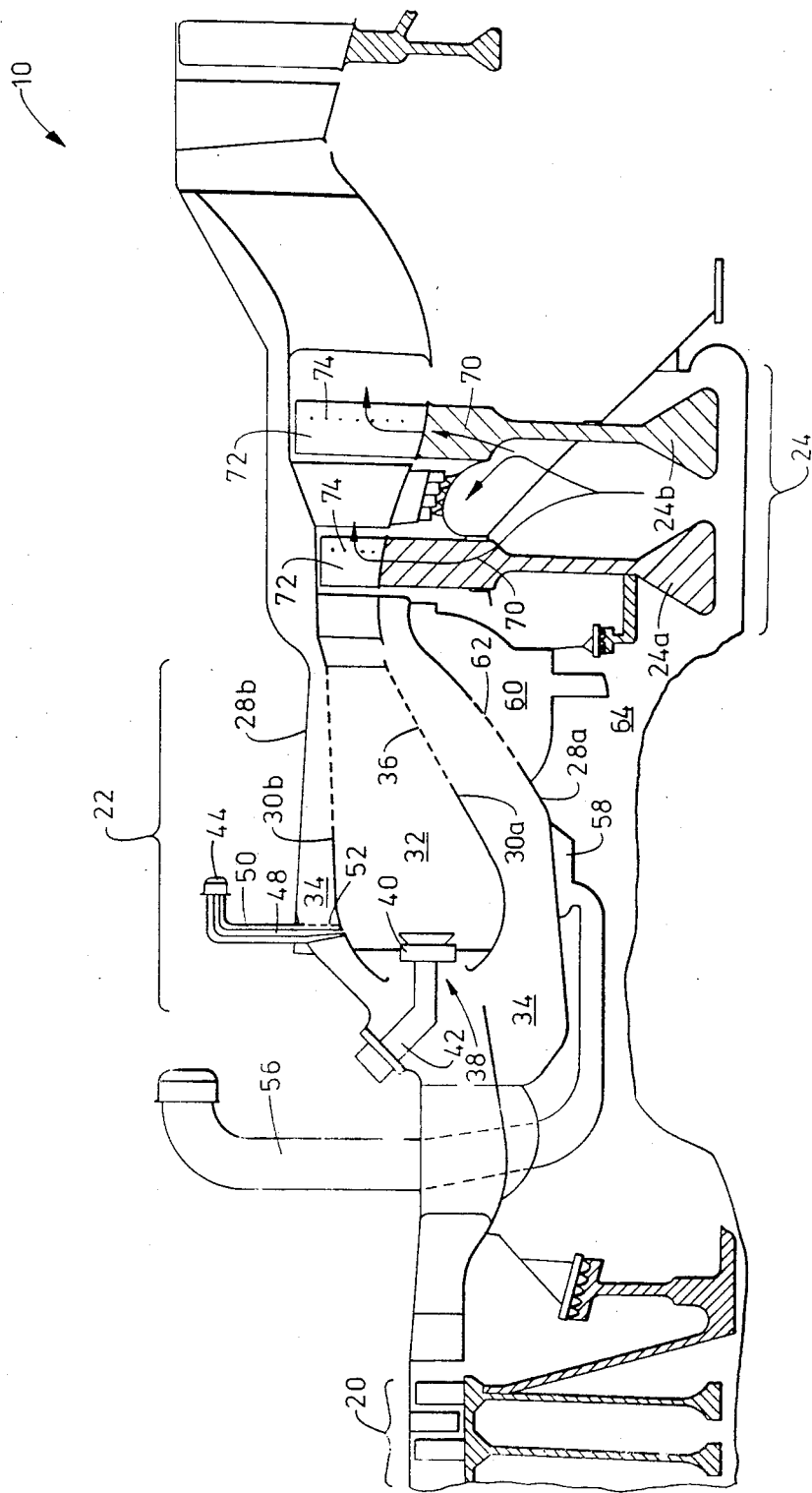
FIG. 1 is a schematic diagram of one embodiment of the invention.

In FIG. 1, a turbine engine 10 comprises a compressor 20 which produces a downstream flow, a combustor region 22 is positioned downstream of the compressor and turbine 24 comprising a high and low pressure turbine stages, 24a and 24b, respectively, are positioned downstream of the combustor region 22.

The combustor region 22 comprises a combustor casing 28 which typically comprises axially and circumferentially extending inner and outer casing walls 28a and 28b respectively, which define an annular flowpath downstream of the compressor 20. Positioned within the casing 28 is a combustor liner 30 which typically comprises circumferentially and axially extending inner and outer liner walls 30a and 30b respectively, which are positioned between the inner and outer casing walls 28a and 28b respectively. The inner and outer liner walls 30a and 30b are radially spaced apart in such a manner as to form an annular combustion zone 32. The liner 30 is also spaced apart from the casing 28 such that a co-annular mixing region 34 is positioned between the liner 30 and the casing 28. The liner 30 typically has a plurality of circumferentially spaced liner openings 36 for conducting the flow from the mixing region 34 into the combustion zone 32. At the upstream end, adjacent the compressor 20, the inner and outer liner walls 30a and 30b respectively, form a combustor inlet 38. A combustor dome assembly 40 is also mounted between and cooperate's with the upstream end of the inner and outer liner walls 30a and 30b respectively, to form the upstream end of the combustion zone 32. A nozzle 42 is positioned adjacent the combustor dome assembly 40 so as to inject fuel into the upstream end of the combustion zone 32.

Preferably, a dual flow fuel nozzle 44 is positioned through the outer casing wall 28b and outer liner wall 30b for injecting both steam and fuel into the combustion zone 32 to control nitrous oxide (NOX) emissions. The dual flow fuel nozzle 44 preferably has a separate fuel passage 48, which is preferably positioned in the center of the dual flow fuel nozzle 44 and a separate steam passage 50 then surrounds the fuel passage 48. The dual flow fuel nozzle 44 has an outer surface and preferably has one or more weep holes 52 which extend from the outer surface to the steam passage 50. The weep holes 52 are positioned between the outer casing wall 28b and the outer liner wall 30b such that a portion of the steam entering the dual flow fuel nozzle 44 passes through the weep holes 52 to enter the mixing region 34. Typically the weep holes 52 are formed to provide preferential mixing. For example, the weep holes 52 may be positioned at any desirable radial location to effect needed cooling by steam to either the casing, the liner, or outer shroud cavities of the turbine rctor blades.

Alternatively, a steam conduit 56 is connected to a steam inlet manifold 58 and the steam inlet manifold 58 is typically mounted to the inner casing wall 28a such that the inlet manifold 58 is adjacent with the mixing region 34. Downstream of the combustor inlet 38 and positioned radially inward of the inner casing wall 28a is a cooling flow collector chamber 60. The cooling flow collector chamber 60 has chamber apertures 62 in the inner casing wall 28a forming the chamber such that a steam and air mixture within the mixing region may enter the cooling flow collector chamber 60. The cooling flow collector chamber 60 is connected to a cavity 64 which is typically defined on its radially inward side by the turbine shaft for conducting the flow from the cooling flow collector chamber 60 to the high and low pressure turbine stages 24a and 24b respectively. The cavity is connected to a plurality of openings in both the high and low pressure turbine stages, 24a and 24b, respectively, such that the steam and air mixture in the cavity 64 may enter each of the turbine stages. The openings in the turbine stages 24a and 24b are connected to one or more cooling passages 70 which are formed in the turbine 24 and typically extend to turbine blades 72 which are positioned along the periphery of the each of the turbine stages 24a and 24b respectively. Typically the blades 72 have a plurality of blade apertures 74 which extend from the cooling passages 70 to the surface of the blades 72 such that the steam and air mixture in the cooling passages 70 may pass through the blade apertures 74 into the primary fluid flowpath to provide cooling for the blades 72.

Figure 2:
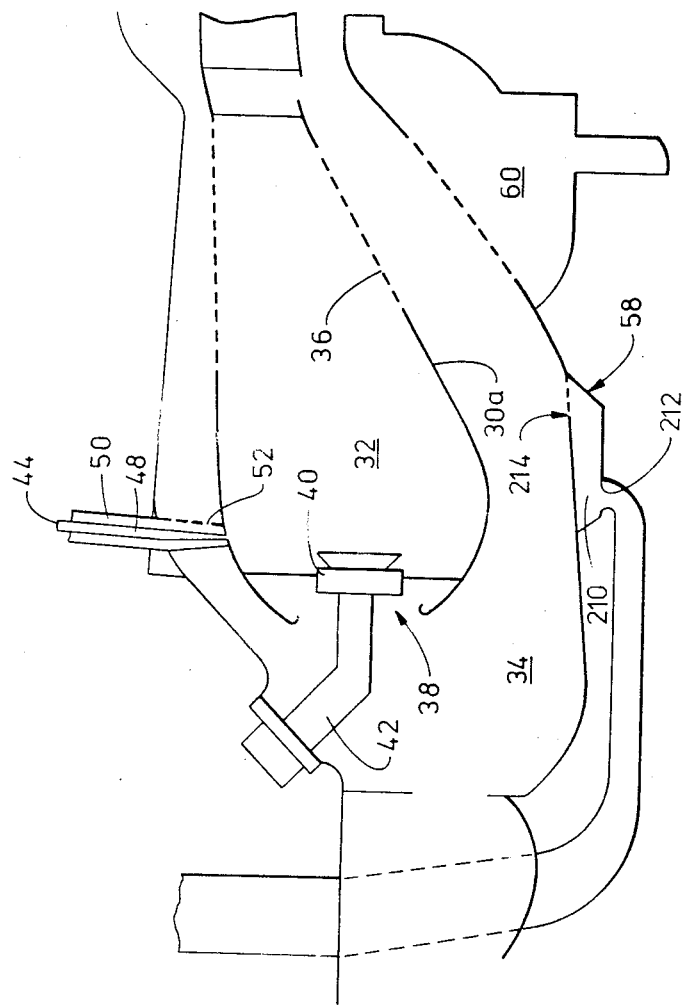
FIG. 2 is an enlarged schematic diagram of the portion of the engine of FIG. 1 depicting the combustor region.

The compressor 20, combustor casing 28, combustor liner 30, combustor dome assembly 40 and fuel nozzle 42, are typically formed by standard techniques well known in the art and preferably are those used in a gas turbine engine of an aeroderivative type. It should be understood that different engine configurations are equally applicable to the present invention such as those employing a plurality of cannular or cannister type combustors. Additionally, multiple fuel nozzles may be used as illustrated in FIG. 1 by incorporating the fuel nozzle 42 and the steam and fuel nozzle 44. Both of these nozzles may be adapted for steam injection, although typically a separate fuel and steam nozzle 44 is used. Further, a single nozzle may be used for fuel injection in the present invention. The steam and fuel nozzle 44 is formed by standard techniques such that the fuel passage 48 and the steam passage 50 are separated at least until the steam and fuel nozzle passes through the outer liner wall 30b, such that only steam is emitted through the weep holes 52 into the mixing region. Typically the weep holes would be any desirable diameter to obtain the desired steam air cooling mixture. The steam conduit 56 and steam inlet manifold 58 may be any material which may provide sufficient temperature and stress durability. When the engine is an aeroderivative type gas turbine engine having a compressor discharge bleed (CDP) port which are typically used on aircraft for environmental control systems bleeds, it is preferably desirable to position the steam conduit 56 in the CDP port. The steam inlet manifold 58 should be formed such that at least a portion of the steam entering the mixing region 34 is entering downstream of the combustor inlet 38. Typically, at least a portion of the steam entering the mixing region is downstream of the combustor dome assembly 40 and preferably all of the steam entering the mixing region is downstream of the combustor dome assembly 40 or the position at which fuel enters the combustion zone 32. As shown in FIG. 2, wherein like numerals correspond to like elements, preferably the steam inlet manifold 58 comprises a steam cavity 210 having a first steam inlet opening 212 connected to the steam conduit 56 and downstream of the opening are one or more steam passage openings 214 in the inner casing wall 28a. This arrangement provides a preferred steam flow path which selectively remains away from the combustor liner 30 so as to not excessively heat the steam mixture while still providing some cooling to the combustor liner 30. It should be understood that by properly positioning or angling the steam passage openings 214, the present invention provides for a preferential distribution of steam entering the mixing region 34 to provide desired temperatures and quantities of fluid in the cooling flow collector chamber 60 and around the combustor liner 30. Preferably at least several steam passage openings are formed which provide adequate circumferential steam and air mixing. The cooling flow collector chamber 60 and the cavity 64 provide a passageway for the steam and air mixture to pass from the mixing zone to the turbine 24, and the cavity 64 is preferably a "mini nozzle" or flow accelerator. Typically, this passageway is formed similarly and is preferably identical to the air cooling circuits provided in standard gas turbine engines such as disclosed by A. P. Adamson in U.S. Pat. No. 4,296,599 entitled "Turbine Cooling Air Modulation Apparatus," incorporated herein by reference. The ability to use existing air cooling circuits in gas turbine engines provides a significant benefit of the present invention by the ability to easily modify existing gas turbine engine designs. The cooling passages 70 of the turbine stages 24a and 24b and the blade apertures 74 are also formed by standard techniques such as disclosed by E. M. Stearns in U.S. Pat. No. 3,703,808 entitled "Turbine Blade Tip Cooling Air Expander;" W. E. Howald in U.S. Pat. No.

3,527,543 entitled "Cooling of Structural Members Particularly For Gas Turbine Engines;" and by J. W. Savage et al. in U.S. Pat. No. 3,715,170 entitled "Cooled Turbine Blade;" all incorporated herein by reference.

In operation, air enters through the compressor 20 and a portion of the compressed air enters the combustion zone 32 through the combustion inlet 38. A portion of the compressed air is diverted and enters the mixing region 34. Low temperature steam which is preferably of sufficient temperature to prevent condensation on the turbine blades, typically about the saturation temperature plus 50 degrees Fahrenheit (°F.) is input into the steam conduit 56 which travels through the steam inlet manifold 58 into the mixing region 34. At least a portion of the steam enters the mixing region 34 downstream from the combustion inlet and preferably downstream from the position at which fuel enters into the combustion zone 32. Preferably, the angle the steam is introduced into the mixing region relative to the air flowing into the mixing region is controlled by the angle or position of the steam passage openings. This allows control of the ratio of the steam air mixture which provides cooling to the liner and the ratio which is introduced into the turbine stages. These ratios may vary from about zero percent (%) to up to almost 100% of steam to air. Air and steam are then mixed in the mixing region 34 and at least a controlled portion of the steam air mixture enters the cooling flow collector chamber 60. The cooling flow collector chamber 60 and cavity 64 serve as a passageway between the mixing region 34 and the turbine cooling passage 70. The steam and air mixture then passes through the turbine cooling passage 70, therefore cooling the high and low pressure turbine stages 24a and 24b, respectively, and preferably at least a portion of the air and steam mixture exits through the blade apertures 74 in the turbine blades 72. Since the steam enters the mixing region downstream from the combustion inlet 38, this provides for significant advantages particularly in the use of low BTU (British Thermal Unit) fuels. Fuels may be introduced which range in content from the typical 20,000 BTU per pound (lb) ranging to or below 500 BTU/lb. These low BTU fuels are typically less than about 10,000 BTU/lb and generally about 3,500 BTU/lb in the case of chemical recuperation or 1,700 BTU/lb in the case of a coal gasification derived fuel. These fuels typically have a high water content and when additional steam used for cooling enters the combustion zone 32, this may result in quenching to give reduced combustion efficiencies and even flameout. However, the present invention allows for control of high internal engine temperatures while allowing for the use of high water content fuels by the use of a preferentially delivered air/steam mixture which preferably enters downstream from fuel entry into the combustion zone 32. Therefore, the cooling steam passes through the combustor liner 30 downstream from where combustion primarily occurs in the combustion zone 32 and the water content within the combustion zone 32 is not increased which may inhibit flame propagation. The cool steam thus does not adversely affect combustion, although the steam still provides cooling for the downstream portions of the liner 30 and other turbine and engine components. Further, by utilizing a combined air/steam mixture, the present invention minimizes the amount of high energy steam which bypasses the turbine blades 72 without doing useful work and therefore minimizes losses in efficiency. As shown in U.S. Pat. No. 4,631,914 by W. R. Hines entitled "Gas Turbine Engine of Improved Thermal Efficiency," issued Dec. 30, 1986, a cycle is more efficient if low energy air is bypassed around the turbine so that high energy steam can be injected in front of the turbine. Additionally, the present invention maximizes the use of cooling structures which are typically incorporated in many engines and in particular, those of the aeroderivative type, and, therefore, minimal changes are required to incorporate these changes in existing and future designs. For example major advantages accrue by using standard aircraft engine turbine blades which do not require modification for the air/steam mixture. Furthermore, the present system will also operate normally with air cooling when all steam is shut off such as when boilers which may be used to generate the steam are shut down or are initially being brought onto line within the system.

I claim:

1. A turbine engine, comprising:
   a compressor for introducing compressed air into said engine;
   a combustor downstream from said compressor, said combustor comprising a casing, and a liner dispersed within and spaced apart from said casing such as to form a mixing region between the liner and the casing, wherein said liner forms a combustor inlet at the upstream end of said combustor and said mixing region receives at least a portion of said compressed air, and said liner is formed such as to allow flow between the mixing region and the combustion zone;
   a turbine downstream from said combustor, said turbine having a cooling passage therein;
   means for introducing steam into said mixing region downstream of said combustor inlet such as to form an air and stream mixture; and
   means for introducing said air and stream mixture into said cooling passage.

2. The engine of claim 1 wherein said combustor has a fuel inlet and said means for introducing steam is disposed downstream of said fuel inlet.

3. The engine of claim 1 wherein said means for introducing steam comprises means for introducing all steam in the engine downstream of said combustor inlet.

4. The engine of claim 1 wherein said engine further comprises a combustor dome positioned within said combustor and wherein said means for introducing steam comprises means for introducing steam downstream of said combustor dome.

5. The engine of claim 1 wherein said means for introducing steam comprises a steam conduit which is connected to a steam inlet wherein the steam inlet comprises a steam cavity having a first opening connected to the steam conduit and downstream of the opening are one or more holes which allow passage of steam into said mixing zone.

6. The engine of claim 1 wherein said engine has a compressor discharge bleed port and said means for introducing steam comprises a steam conduit positioned in said compressor discharge bleed port.

7. The engine of claim 1 wherein said means for introducing steam comprises a dual flow fuel nozzle which extends through the casing, mixing region and liner, said nozzle having a fuel passage and a steam passage therein and said fuel and steam passages are separated at least until the dual flow nozzle passes through the liner, said dual flow nozzle having an outer surface and having at least one hole extending from the surface to said steam passage such that a portion of the steam may exit into the mixing region.

8. The engine of claim 1 wherein said turbine has a plurality of blades and said blades have a plurality of holes which extend from the cooling passages to the surface of the blades.

9. A turbine engine, comprising:
a compressor for introducing air into said engine;
a combustor downstream from said compressor, said combustor comprising a casing, and a liner positioned in said casing such as to contain a combustion zone therein, said liner being spaced apart from said casing, a mixing region is positioned between the liner and casing, said liner having a combustor inlet at the upstream end of said combustor, and said liner is formed such as to allow flow between the mixing region and the combustion zone;
a turbine downstream from said combustor, said turbine having a cooling passage therein;
a steam conduit connected to a steam inlet, and said steam inlet is connected to said casing, said inlet has at least one inlet hole which connects said steam inlet with said mixing region and said inlet hole is downstream from said combustor inlet; and
a passageway between said mixing region and said turbine cooling passage, said passageway being downstream of said steam inlet hole.

10. The engine of claim 9 wherein said combustor has a fuel inlet and said steam inlet hole is downstream of said fuel inlet.

11. The engine of claim 9 wherein said engine has a plurality of steam inlet holes and all of said steam inlet holes are downstream of said combustor inlet.

12. The engine of claim 9 wherein said engine further comprises a combustor dome positioned within said combustor and wherein said steam inlet hole is positioned downstream of said combustor dome.

13. The engine of claim 9 wherein the steam inlet comprises a steam cavity having a first opening connected to the steam conduit and said steam inlet hole is positioned downstream of the opening.

14. The engine of claim 9 wherein said engine has a compressor discharge bleed port and said steam conduit is positioned in said compressor discharge bleed port.

15. The engine of claim 9 further comprising a dual flow fuel nozzle which extends through the casing, mixing region and liner, said dual flow nozzle having a fuel passage and a steam passage therein and said fuel and steam passages are separated at least until the dual flow nozzle passes through the liner, said dual flow nozzle having an outer surface and having at least one hole extending from the surface to said steam passage such that a portion of the steam may exit into the mixing region.

16. The engine of claim 9 wherein said turbine has a plurality of blades and said blades have a plurality of holes which extend from the cooling passages to the surface of the blades.

* * * * *